No. 741,260. Patented October 13, 1903.

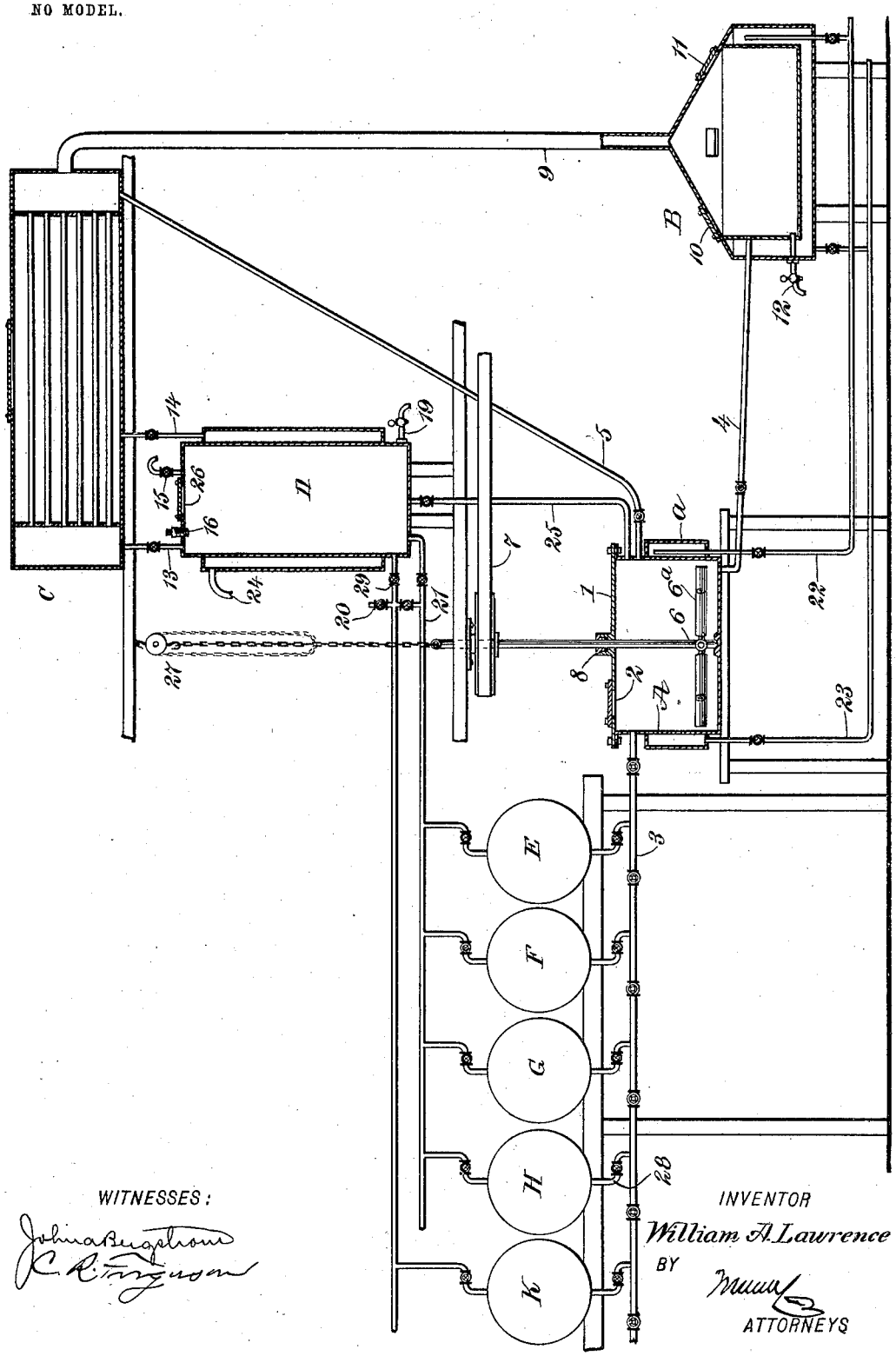

UNITED STATES PATENT OFFICE.

WILLIAM APPLETON LAWRENCE, OF NEW YORK, N. Y., ASSIGNOR TO CONTINENTAL RUBBER COMPANY, OF JERSEY CITY, NEW JERSEY, A CORPORATION OF NEW JERSEY.

PROCESS OF REFINING CRUDE RUBBER.

SPECIFICATION forming part of Letters Patent No. 741,260, dated October 13, 1903.

Application filed March 19, 1902. Renewed May 27, 1903. Serial No. 159,041. (No specimens.)

*To all whom it may concern:*

Be it known that I, WILLIAM APPLETON LAWRENCE, a citizen of the United States, and a resident of the borough of Brooklyn, city and State of New York, have invented a new and Improved Process of Refining Crude Rubber, of which the following is a full, clear, and exact description.

This invention relates particularly to a process for separating from crude rubber the objectionable resins contained in it and at the same time and by the same process removing certain other objectionable impurities, as water and naphtha, by which process I am enabled to greatly enhance the value of the product for use in the manufacture of rubber goods.

That the usefulness of my invention may more clearly appear, certain facts in regard to crude rubber should be first understood.

The best commercial rubber heretofore in the market (Para) contains from twenty-four per cent. to forty per cent. of water and from one per cent. to five per cent. of resin. Madagascar crude rubber contains some twenty-five per cent. of resin, and the crude rubber extracted from the Guayule shrub (*Parthenium argentatum*) as extracted by me from the shrub by a naphtha solvent contains some thirteen per cent. of naphtha and twenty-two per cent. of resin. Thus, speaking broadly, there are in all these gums from twenty-five per cent. to forty per cent. of impurities in the form of resin, water, or naphtha in varying quantities of each in different gums, but amounting collectively in each to from twenty-five per cent. to forty per cent. of the total weight of the crude gum, which impurities my invention removes from the gum by a process at once efficient and economical, and therein consists its usefulness.

I will describe my invention first as to the chemical principles on which it is based.

It is well known in the arts that naphtha is a solvent both of rubber itself and also of the resins in crude rubber and that alcohol is a solvent of the resins in crude rubber, but is not a solvent of the rubber itself; but there is another fact which I believe myself to be the first to observe and to bring into industrial and useful practice—namely, that naphtha is soluble in alcohol in certain proportions varying materially with the temperature.

For brevity I use in this description the term "naphtha" as covering any of the lighter products of petroleum of from 62° to 90° Baumé.

By "alcohol" I mean either ethylic or methylic alcohol and will say now, once for all, that in practice I find that methylic or commercial wood-alcohol to be fully as efficient as the ethylic or ordinary commercial (ninety-five per cent.) alcohol and that I prefer the wood-alcohol, especially on account of its cheapness as compared with the present cost of ethylic alcohol.

Reference is to be had to the accompanying drawing, forming a part of this specification, in which the figure is a sectional elevation of one form of apparatus by means of which my process may be carried out.

The apparatus comprises a macerator A, constructed, preferably, of steel, jacketed, as at $a$, for steam or, preferably, hot water, and is fitted with a movable top 1, in which is a manhole 2, the inlet-pipe 3, the outlet-pipe 4, connecting it with an evaporator B, the vapor vent-pipe 5, connecting it with a refrigerator C, and the revolving agitator 6, driven by a belt 7. The shaft 6 has a bearing in the stuffing-box 8 and is capable of being elevated out of and lowered into the macerator A and of being raised or depressed while in use. On its lower end are preferably four radial and corrugated sleeved rollers $6^a$ for stirring and flattening out the gum under treatment. The macerator is also connected with the steam-pipe 22 and drip 23.

The evaporator B is constructed of steel, steam-jacketed, and may be of any one of the forms well known in the arts for evaporation, but preferably as shown, and placed, as shown, so sufficiently lower than the macerator A as to allow the liquid contents of the macerator to flow rapidly into the evaporator B by gravity and at will by means of the valved pipe 4. The evaporator is connected with the refrigerator C by the large vapor-pipe 9. Manholes 10 11 and a large outlet-pipe 12 are provided for the evaporator, as shown, for the removal of the denser residuum after evaporation of liquids has been conducted as far as desired.

In cases where special speed of evaporation is desired a vacuum-pump may be attached to the evaporator at any convenient point, so as to convert the evaporator at will into the well-known vacuum-pan; but as this device is well known in the arts and is not necessary in ordinary use of the apparatus I omit it from my description.

The refrigerator C, as shown, is a well-known form of cooling-coil used in chemical works convenient for my process and needing no description except to say that the space around the coil-pipes may be filled with ice and salt, giving the refrigerator a cooling power of zero Fahrenheit, which method I find amply sufficient and most economical in my own practice, or the cooling may be effected by any convenient form of the well-known refrigerating-machines.

The separator D is constructed of steel, jacketed, as shown, and having a manhole 26. It is placed below the refrigerator C, so that the distillate from the refrigerator will flow by gravity into the separator, through the valved pipe 13, and the drip or cooling medium of the refrigerator can be admitted by the valved pipe 14 into the jacket of the separator, which latter is also provided at the top with the vent 15. The separator has an opening normally closed by a plug 16, this opening being for the admission of a siphon at will and has the jacket-drip 24, the valved exit-pipes 25 and 29, the petcock 19, the siphon-receiving pipe 20, and the valved exit-pipe 21, connecting the separator with receivers E, F, G, and H, in which receivers are to be stored—alcohol in E, recovered naphtha in F, naphtharized alcohol in G, and watered alcohol in H—each of these receivers being provided with air or vapor vents, gage-glasses, and registers of contents. The differential pulley 27 is arranged for lifting the cover and agitator of the macerator, and the macerator, evaporator, refrigerator, and separator may be provided with all needed thermometers and steam-regulators for ascertaining and controlling temperatures.

Before proceeding further to describe my process and invention in detail it is well to observe that the various crude-rubber gums as found in the market contain, as impurities, some of them much water and little resin, some of them much resin and little water, and some of them both naphtha and resin, and in some cases also some water. These varying amounts of water, resin, or naphtha in the various rubber gums to be treated by my process require some slight modifications in the proportionate amount of alcohol used, and consequent slight changes in distillations are involved; but as the new and peculiar features of my process are to be carried out in the refining of each and every sort of crude gum and as the slight changes required with different gums are such as must suggest themselves inevitably to any one skilled in the arts I propose to take a single gum as an example of all, and I select the crude-rubber gum of the Guayule shrub (*Parthenium argentatum*) as the best example for my purpose.

I find by quantitative analysis that a sample of the crude-rubber gum of the Guayule shrub now to be refined is made up as follows:

| | |
|---|---:|
| Volatile matter (naphtha) | 13.70 |
| Resinous matter | 22.05 |
| Ash | .40 |
| Rubber | 63.85 |
| Total | 100.00 |

Both the resin and the naphtha are here deleterious substances, and I proceed to remove them both by my new process.

The macerator A is constructed for a charge of four hundred pounds of crude Guayule gum, which in its present naphtharized and resinous state is of about the consistency of tar. This is dumped into the macerator and spread pretty evenly over the bottom, to which before being alcoholized it adheres firmly. The agitator and cover are now lowered, so that the radial sleeved rollers press firmly by gravity on the gum, the iron corrugated sleeves being made of such thickness and weight as to give any desired pressure on the gum for maceration and contact with the alcohol. The shaft 6 is to be now properly adjusted, the cover bolted down tight by means of gaskets on the rim, and the shaft belted to power. Through the valved pipe 3 from the graduated tank H three hundred gallons of wood-alcohol are drawn into the macerator A. The refrigerator C is packed with ice and salt and the valves to pipes 5, 13, and 14 are opened. The agitator 6, geared to a speed of about four revolutions per minute, is set in motion, and steam is admitted to the jacket of the macerator, bringing the alcohol to a temperature not exceeding 122° Fahrenheit, which at the present stage of this art is regarded as the upper limit to be reached with safety to the gum. During the raising of the temperature I have observed that although the boiling-point of the alcohol is 152° Fahrenheit and that of the naphtha (say 74° Baumé) is 160° to 210° Fahrenheit, yet the mixture of alcohol and naphtha which I now have in the macerator has a boiling-point of about 108° Fahrenheit. The vapor, therefore, which arises in the macerator during the raising of the temperature from 108° to 122° Fahrenheit I conduct by the pipe 5 to the refrigerator C and recover it in the separator D. In about twenty minutes the three hundred gallons of alcohol in the macerator have become saturated with the resin and naphtha of the gum. This saturated alcohol is now drawn off through the pipe 4 into the evaporator B and is there evaporated through the pipe 9 into the refrigerator C and recovered in the separator D, leaving the resin in the evaporator B as a by-product to be drawn off at will while warm and then flowing easily through the outlet-pipe 12. Closing the valve in the pipe 4 a second charge now of two hundred gallons is in the same manner admitted to the macerator, and at the end of about fifteen minutes practically all the naphtha and resin in the charge of crude gum thus treated in the macerator have been extracted. This second charge, now of partly-saturated alcohol, is drawn off into the evaporator B and there evaporated and recovered in the separator D, as before. In cases where extreme purity from resin and naphtha is desired a third charge of one hundred gallons may be admitted to the macerator A for about ten minutes, simply as a wash or "sparge," and drawn off and evaporated in the evaporator B, as before. At this time there is in the macerator A a plastic solid mass of practically pure-rubber gum, which no longer adheres to the inside of a macerator and which by raising the shaft and with it the unbolted cover of the macerator by means of the differential pulley 27 can now be readily removed for use and for a greatly-enlarged use in the arts and with a greatly-enhanced value by means of this removal of some thirty-three per cent. of its original weight in the shape of impurities.

In the separator D is recovered practically all the alcohol used in the process and all the naphtha originally in the four hundred pounds crude Guayule gum, or altogether about ten gallons of naphtha and six hundred gallons of alcohol.

I have discovered in practice that a mixture of alcohol and naphtha running as high as twenty-five per cent., by volume, of naphtha will not attack the rubber itself and will remove the resin quite as efficiently as the unmixed alcohol. The mixture now in the separator D is, however, by volume, only about 1.67 per cent. of naphtha, and can therefore be used again and again for refining successive batches of naphthous and resinous gum until the percentage of naphtha in the recovered mixture in the separator D shall exceed twenty-five per cent.; but I have also discovered that a mixture of alcohol and naphtha containing, by volume, twenty-five per cent. of naphtha when reduced to a temperature obtained by a mixture of ice and salt, and therefore nearly zero Fahrenheit, separates into two distinct layers, the upper layer being almost pure naphtha and the lower layer being composed of substantially twenty-two per cent. naphtha and seventy-eight per cent. alcohol. The bottom layer in the separator D therefore being held by the apparatus and process as described at a temperature near zero can never exceed twenty-five per cent. of naphtha, for all the naphtha in excess of twenty-two per cent. is at the temperature of the separator D set free, forming a top layer, which is at intervals drawn off by the siphon from the opening at 16 into the pipe 20 and thence into the receiver G, where it is stored for use, either in extracting the crude gum from the Guayule shrub or in softening other gums for treatment by my process. The contents of the separator D, therefore, except the excess of naphtha disposed of as stated, can always be drawn from the separator direct into the macerator A by the pipe 25 for use again in the process. In the case of naphthous gums, therefore, the process is practically an endless chain, the alcohol being conveyed around and around without the need of pumps and used over and over again, the very small amount of waste or shrinkage being restored at will and at long intervals from the tank E.

In the case of gums containing water, the gum having been prepared by any of the well-known methods of comminuting and softening such gums, my process does not differ materially from the refining of the gum described above.

The well-known avidity of alcohol for water removes the water thoroughly and speedily from the prepared gum, and when the alcohol thus used has become saturated with water it is drawn off into tank H for this purpose provided, from which it is drawn off at will through the pipe 28 and freed from its water by any of the well-known methods of concentrating alcohol.

Although I have thus clearly described an apparatus and process by which the removal from crude rubber gums of such impurities as resin, naphtha, and water is rapidly, thoroughly, and economically accomplished, and thus the object of my invention obtained, I do not limit myself to the precise arrangement and construction of the apparatus described, nor do I limit myself to gums extracted from plants or shrubs by naphtha, but I include in my process the refining of gums extracted from plants by bisulfid of carbon, the only notable variation from the process already described being that the excess of bisulfid of carbon forms the bottom layer in the separator D and is drawn off at will from the bottom of the separator through the pipe 29 to the tank K, separately provided for this purpose on account of the disagreeable odor.

Having thus described my invention, I claim as new and desire to secure by Letters Patent—

1. The process of refining crude-rubber gum, consisting in subjecting the gum to the action of alcohol, which forms a solution of resin and naphtha and alcohol, then evaporating the alcohol and naphtha from the resin, then condensing the vaporized alcohol and naphtha and separating the same.

2. A process of refining crude-rubber gum, consisting in agitating the gum in alcohol, then vaporizing to separate the alcohol from the gum, and then refrigerating to separate the alcohol from by-products, substantially as specified.

3. The process of refining crude-rubber gum, consisting in agitating the gum in alcohol, evaporating the alcohol from by-products carried with it from the gum, then by refrigeration reducing the alcoholic vapor to liquid form, and then separating from the alcohol impurities that may be contained therein, whereby the alcohol is restored for further use.

4. A process of refining a naphthous and resinous crude-rubber gum, consisting in first subjecting the gum to the intimate action of alcohol, thus forming a solution of resin and naphtha in alcohol, evaporating the alcohol and naphtha, leaving the resin in the evaporator to be drawn off as a by-product, condensing the vaporized naphtha and alcohol to a liquid form, and at will, by such a degree of cold that the liquid alcohol and naphtha will form two distinct layers, so that the naphtha may be removed as a by-product, whenever, or before, the alcohol contains a proportion of naphtha so large as to form a mixture capable of injuriously attacking the rubber itself in the crude-rubber gum under treatment, substantially as specified.

In testimony whereof I have signed my name to this specification in the presence of two subscribing witnesses.

WILLIAM APPLETON LAWRENCE.

Witnesses:
   W. G. MAYER,
   LOUIS P. FUESS.